United States Patent
Rickey (10) Patent No.: US 6,308,264 B1
(45) Date of Patent: Oct. 23, 2001

(54) DUAL USE MASTER BOOT RECORD

(75) Inventor: Albert E. Rickey, Lake Forest, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/163,359

(22) Filed: Sep. 30, 1998

(51) Int. Cl.$^7$ .................................................. G06F 15/177
(52) U.S. Cl. .............................................. 713/2; 713/100
(58) Field of Search .................................. 713/2, 100, 1; 714/7; 711/1

(56) References Cited

U.S. PATENT DOCUMENTS

| | | | |
|---|---|---|---|
| 5,546,585 | 8/1996 | Soga ..................................... | 395/700 |
| 5,630,093 | * 5/1997 | Holzhammer et al. ............... | 395/442 |
| 5,692,190 | * 11/1997 | Williams ................................ | 713/2 |
| 5,694,600 | * 12/1997 | Khenson et al. ..................... | 713/2 |
| 5,701,477 | * 12/1997 | Chejlava, Jr. ......................... | 713/2 |
| 5,715,455 | * 2/1998 | Macon, Jr. et al. ................... | 395/621 |
| 5,754,853 | * 5/1998 | Pearce .................................. | 713/2 |
| 5,764,593 | * 6/1998 | Turpin et al. ......................... | 713/2 |
| 5,887,163 | * 5/1999 | Nguyen et al. ....................... | 713/2 |

FOREIGN PATENT DOCUMENTS

WO 97/29451    8/1997    (WO) .

OTHER PUBLICATIONS

J. Goodman, Hard Disk Secrets, IDG Books, (1993) pp 40, 243, 259–261.

* cited by examiner

Primary Examiner—Thomas Black
Assistant Examiner—Mary Wang (57) ABSTRACT

A high capacity computer article of manufacture to be loaded into a drive of a computer that includes a memory, comprising: a computer usable medium including at least one partition area and a boot sector, with the computer usable medium having computer readable program code means embodied therein, comprising: first computer readable code means fixed in the boot sector including a first BIOS parameter block for setting parameters for the medium if inserted in a floppy drive of the computer; and second computer readable code means fixed in the boot sector comprising a Partition Table for organizing the medium to include at least one partition and for designating an active partition. In a further embodiment of the invention, the article of manufacture includes: third computer readable code means fixed in the active partition area on the computer readable medium and including a second BIOS parameter block, and DOS boot record code for locating operating system files, loading the operating system files into the memory of the computer and causing the computer to execute them; and fourth computer readable code means fixed in the boot sector comprising a master boot record code for loading into the memory of the computer the third computer readable code means comprising the second BIOS parameter block and the DOS record code of the active partition listed in the Partition Table, and causing the computer to execute the DOS boot record code using parameters from the BIOS parameter blocks in accordance with whether the DOS boot record code was loaded from a floppy drive or a hard drive.

10 Claims, 4 Drawing Sheets

DUAL USE MASTER BOOT RECORD

FIELD OF THE INVENTION

The present invention relates generally to the field of computer storage, and more particularly to high capacity removable media devices which may be accessed and booted, regardless of format configuration, as either a floppy or hard disk.

BACKGROUND OF THE INVENTION

The current standard 1.44 megabyte floppy removable media is becoming increasingly inadequate to meet user needs. In response, BIOS vendors have begun offering systems which allow High Capacity Removable Media (HCRM) drives, such as Iomega Corporation's ZIP® drive, to be BIOS configurable as either a hard drive, or a floppy drive. Although HCRM drives are not new to the PC industry, they have traditionally been used as removable hard drives, and therefore the HCRM media is generally partitioned in the same manner as conventional hard disks. One of the problems stemming from the use of HCRM drives as floppies is the inability of DOS based operating systems to boot from or access partitioned media in a floppy drive. Because of the ability to change the configuration of the drive, a single format is needed that will boot, and allow access to the media, regardless of it's current configuration. This format should be compatible with existing partitioned media so that they can be used without requiring reformatting, or otherwise destroying the data they contain.

The boot process of IBM compatible computers begins with the BIOS reading the boot sector of the boot drive into memory and executing it. If the required boot record code and/or data structure is missing from the media, the boot process will fail to load the operating system. For example, in systems which allow HCRM drives to be configured as either A: (i.e. a floppy) or C: (i.e. a hard disk); with the HCRM drive configured as C: the partitioned media will boot because a Master Boot Record (MBR) and Partition Table are present in the boot sector. However when a HCRM drive containing a partitioned media is configured as A:, where no Partition Table is required, the media will fail to boot. This is because the standard MBR code is designed to boot a hard drive, and always assumes a BIOS drive number of 80h. Conversely, if the user is attempting to boot from a floppy formatted media in a drive configured as C:, the boot will fail because the variable in the BIOS parameter block that tells the DOS Boot Record (DBR) code which BIOS drive number to boot from, will be set to 00h.

The reason for the system's failure to boot is due to the fact that operating systems, which are designed to read DOS formatted disks, require different data structures to be present in the boot sector of the disk depending on whether the disk drive is a floppy drive (typically having BIOS drive numbers 0 or 1) or a hard disk drive (typically having BIOS drive number 80h or higher). The operating system initially determines how it will access media configured as floppy by scanning each floppy drive (BIOS drive number 0 and 1) and using the BIOS Parameter Block (BPB), to locate the media's root directory, FATs, and data area. The operating system will assign a drive letter when the presence of drive 0 (A: ) and 1 (B: ) is detected. However, media access is determined by the presence of a correct BPB at sector 0; that is, the data contained in drive A: or B: can only be accessed when the BPB is present at sector 0. For partitioned media such as a HCRM configured as C:, the operating system will scan all drives looking for DOS type partitions, as defined in the system type file of the Partition Table, and will only assign a drive letter if a BPB is found in the first sector of each partition. The BPB for a hard drive formatted media does not reside in sector 0. Therefore, when attempting to use a partitioned HCRM as A: (i.e. a floppy), the operating system will not be able to access the data on the media.

To support existing HCRM media, a solution is needed that will allow partitioned media to function properly when inserted into a floppy configured HCRM drive. As indicated above, this requires addressing two problems, booting, and access to data. Additionally, for a solution to be viable, it must provide a simple way for existing media to be updated, without compromising the user's data.

SUMMARY OF THE INVENTION

The present invention solves the problems discussed above that are associated with accessing and booting a removable partitioned computer storage media, such as a HCRM device, as a floppy. In accordance with the present invention a removable partitioned media can be both accessed and booted by the operating system as either a floppy or a hard disk, by replacing the standard MBR with a Dual Use MBR. To allow the operating system to locate the BPB where it is expected to reside, which for floppy drives means that a BPB must be located at sector 0, and for fixed disks a BPB must be present in the first sector of the partition, the present invention takes a hard drive formatted media and replaces the contents of the Boot Sector with a new MBR, refered to in this disclosure as "DUMBR" (Dual Use Master Boot Record), that contains new code in accordance with the invention, a Partition Table, and the addition of floppy BPB. The new code first determines the drive number used by the system BIOS for initiating the boot process and saves the result. Once the DBR of the first active partition is read into RAM, the new code then determines if the saved drive number value is 0 (or 00h), indicating that the boot drive is a floppy. If the boot was initiated from a floppy (saved drive number is 0), the new code overwrites the hard disk BPB in RAM with the floppy BPB of DUMBR. The code then jumps to the DBR code in the RAM buffer that has been overwritten with the floppy BPB, and the boot process continues as normal.

DETAILED DESCRIPTION OF THE PREFERRED EMBODIMENT

The following definitions and examples are provided to set forth the context of the present invention.

Master Boot Record (MBR) is located in the Boot Sector of a hard drive. The MBR contains a Partition Table, a validation signature, and code for locating the active partition of the hard disk and loading and executing the bootstrap loader for the operating system. (For Example See Table 1)

TABLE 1

(MBR)

| Byte Offset | Field Length | Sample Value | Meaning |
|---|---|---|---|
| 000h | 446 bytes | | Code portion of the Master boot record |
| 1Beh | 64 bytes | | Partition Table (4 16 byte entries) |
| 1Feh | 2 bytes | 55h AAh | Validation signature |

DOS Boot Record (DBR) is found at the beginning of a DOS partition of a media formatted as a hard disk, and in the Boot Sector of a DOS formatted floppy disk. The DBR contains a BIOS Parameter Block (BPB) and code to locate and execute an operating system kernel file. Fixed or hard disks generally contain a reserved area of at least one sector is used to hold the DBR. (For Example See Table 2)

TABLE 2

(DBR)

| Byte Offset | Field Length | Sample Value | Meaning |
|---|---|---|---|
| 000h | 3 bytes | N/A | Jump over the BIOS parameter block |
| 003h | 8 bytes | N/A | System name field |
| 00Bh | 51 bytes | N/A | BIOS parameter block |
| 03Eh | 448 bytes | N/A | Code portion of the DOS boot record |
| 1Feh | 2 bytes | 55h AAh | Validation signature |

Boot Sector comprises one or more sectors containing the boot record to be loaded by the BIOS to initiate the boot process. Traditionally, the boot sector is the first sector, which is addressable on X86-based PC's as cylinder 0, head 0, sector 1, or LBA 0. For "fixed" or hard disks the first sector contains the MBR, with the remaining sectors being unused. Each partition of the hard disk is configured in the same manner as a floppy, with the first sector containing the DBR.

Boot Track is also called the Reserved Track, and is the first track of a hard drive, or an extended partition. It contains a MBR in the first sector, with all the remaining sectors being unused.

Hidden Sectors can generally comprise sectors 0–63 in DOS formatted disks, and generally constitutes the area used for the Boot Track on hard disks. The specific number of sectors that comprise the Hidden Sectors area is specified in the BIOS Parameter Block (BPB). For floppy disks this area, or number of sectors, is 0. (For Example See Table 3).

TABLE 3

(Logical Structure of a DOS Formatted Disk)

| Hidden Sectors | Hidden Sectors area used for boot track on fixed disks. The number of sectors in this area is specified in the hidden sectors filed of the BPB (reference #10). For floppies this area is 0 sectors. |
| DOS Boot Record (DBR) (1st reserved sector) | |
| Additional Hidden Sectors | Reserved sectors area is used for the DBR. There may be additional reserved sectors allocated when the media is formatted. The number of sectors in this area is specified in the reserved sectors filed of the BPB (reference #2) |
| File Allocation Table 0 | |
| File Allocation Table 1 | |
| Root Directory | |
| Data | |

Reserved Sectors are those sectors in all DOS formatted disks following the Hidden Sectors area, and is used to contain the DBR. Additional Reserve Sectors may be allocated when the media is formatted. The specific number of Reserved Sectors is identified in the BPB. (For Example See Table 3).

BIOS Parameter Block (BPB) is a DOS specific data structure, which describes the format of a fixed or floppy disk. (For Example See Table 4)

TABLE 4

(BPB)

| Reference # | Byte Offset | Field Length | Sample Value | Meaning |
|---|---|---|---|---|
| 0 | 00h | Word | 200h | Number of bytes per sector |
| 1 | 02h | Byte | 8 | Number of sectors per cluster |
| 2 | 03h | Word | 1 | Number of reserved sectors, accounts for the DBR sector |
| 3 | 05h | Byte | 2 | Number of File Allocation Tables |
| 4 | 06h | Word | 200h | Number of root directory entries |
| 5 | 08h | Word | 0 | Total number of sectors if less than 65,536 |
| 6 | 0Ah | Byte | F8h | Media descriptor |
| 7 | 0Bh | Word | A0h | Number of sectors per File Allocation Table |
| 8 | 0Dh | Word | 3Fh | Number of sectors per track |
| 9 | 0Fh | Word | 10h | Number of heads |
| 10 | 11h | Dword | 3Fh | Number of hidden sectors (0 for a floppy) |
| 11 | 15h | Dword | 1FE034h | Total number of sectors if word at offset 8 is 0 |
| 12 | 19h | Byte | 80h | Physical drive number (0 for floppy) |

Partition Table describes the allocation of storage space on a hard disk (For Example See table 5)

TABLE 5

Partition Table

| Byte Offset | Field Size | Meaning |
| --- | --- | --- |
| 00h | Byte | Boot indicator flag. 80h if partition bootable, otherwise 00h |
| 01h | Byte | Starting head of the partition |
| 02h | Word | Starting cylinder and sector of partition |
| 04h | Byte | System type |
| 05h | Byte | Ending head of partition |
| 06h | Word | Ending cylinder and sector of partition |
| 08h | Dword | Prior Sectors |
| 0Ch | Dword | Total Sector in partition |

DOS means any operating system that reads DOS formatted media, including but not limited to Windows9[2], Windows 98, OS/2, Novell DOS, and Digital Research DOS.

The present invention is designed for any operating systems designed to read DOS-formatted media. In DOS formatted media the MBR is located in the Hidden Sectors area The remaining sectors in this first track are generally unused. The fundamental problem that occurs when a medium is loaded into a drive with a device number of 0 or 1 (as a floppy) is that the operating system expects to find a floppy BPB in the first sector. In contrast, when the same medium is loaded into a hard drive with a device number of 80h or higher, the operating system will expect to find a Partition Table in the Boot Sector of the disk. Accordingly, a medium which is formatted with a Partition Table will not be readable from or bootable from a floppy drive with a device number of 0 or 1 because there is no floppy BPB in the Boot Sector.

It should also be noted that users are now allowed to go into a menu-based set-up program where the user can specify whether the BIOS should designate a HCRM media with a floppy number or a hard drive number. Prior to the availability of this set-up program function, such high capacity removable media had traditionally or generally been treated as hard drives. Accordingly, these hard drive formatted media, when converted to have a floppy number designation for the media and then loaded into a floppy drive device, were not addressable or bootable because the DOS expected to find a floppy BPB in the boot sector.

If the computer has already booted, or is booting from another device, and it is only desired to be able to address (but not boot from) the removable media (such as HCRM), then a BIOS parameter block is required which may be either present in the Boot Sector of the media, or may be loaded into the memory of the computer from a network or from another peripheral memory, for devices which emulate a disk drive.

It is generally desirable to not only be able to address the media in either a floppy drive or a hard drive but also to be able to boot from that media. In order to be able to boot from the media in either type of drive, a new Dual Use Master Boot Record in accordance with the invention is provided in the media's Boot.

The present invention, therefore, in one aspect makes a single computer readable medium that is formatted as a hard disk, addressable by the operating system as either a floppy disk drive or a hard disk drive. The invention comprises the addition of a computer code in the MBR and a floppy BPB for describing the correct data structure for the medium if the medium, such as a HCRM type media, is inserted in a floppy drive of the computer. The computer code determines the drive number from which the system BIOS attempted to boot, and uses this value to determine whether or not to overwrite the BPB of the active partition loaded into RAM during the boot process with the floppy BPB contained as part of the MBR. If the drive number read by the computer code is a 0 (00h), indicating the BIOS initiated the boot process from a floppy drive, the computer code initiates the overwriting of the hard disk BPB with the floppy BPB so the correct data describing the format of the media is available for the DOS boot record code to use for locating and executing the operating system. As noted previously, a DOS formatted disk will have the structure described in Table 3. A formatted hard disk is basically a collection of floppy like images, called partitions, which are pointed to by the Partition Table located in the MBR, which is contained in the Boot Sector of the hard disk. The hard disk format utilizes the first sector of the first track (defined herein as Boot Sector) of the Hidden Sectors area of the DOS format structure to place the MBR, with the remaining sectors remaining unused. The hard disk BPB will identify the specific number of sectors that are designated as Hidden Sectors for this purpose (see Table 4, reference 10), and will have the physical drive number field set to 80h and the Reserve Sectors field set to 1. The hard disk partitions, being a collection of floppy images, will have the same structure as a floppy formatted disk, and therefore will have its BPB indicate 0 for the number of Hidden Sectors, and have the DBR in its Boot Sector, followed by two copies of the FAT (File Allocation Table) and the root directory.

The hard drive boot process is a super set of the floppy boot process. It begins with the BIOS loading the MBR from the Boot Sector of the hard drive into memory at 0:7C00h, and transferring control. The MBR first relocates itself to 0:600h, to free memory location 0:7C00h for the DBR, then searches the Partition Table for an active partition. If an active partition is found, the MBR loads the DBR, usually from the first sector of the partition, into memory at 0:7C00h, and transfers control. From this point on the boot process is identical to the floppy; wherein a floppy boot begins when the BIOS reads the DBR from the first sector of the floppy into memory at location 0:7C00h, and transfers control. The DBR uses the information in the BPB to locate the root directory, and verify that the necessary operating system files are on the disk. If the files are present, the DBR loads the first several sectors of IO.SYS into memory, and transfers control. IO.SYS, completes the job of loading the operating system. If the system files are not in the root directory, the DBR prints an error message indicating that the media is not bootable.

Access to fixed disks requires that a DOS type partition structure be defined in the Partition Table, and that a proper BPB is in the first sector of that partition. Any non-DOS based partitions in the Partition Table are ignored, and no drive letter will be assigned. Although DOS operating systems will assign a drive letter to any floppy drive that is installed in the system, access to the media is only given if the operating system recognizes the media as having a DOS compatible format. The operating system expects all floppies to have a BPB in their boot sector. The BIOS parameter block tells the operating system how large the media is, and where the various areas of the media start and stop.

The standard DOS MBR code for hard disk formatted media is written to the drive by FDISK.EXE, and always assumes a drive number of 80h. When a partitioned media is booted in the A: drive, the MBR code will find the active partition, but when it attempts to read the DBR, it will read from drive 80h instead of drive 0. This results in the wrong drive being read. Assuming the MBR were able to read from drive 0, the BPB still would have a physical drive number filed set to 80h, which also prevents a hard drive DBR from being able to boot as drive 0. Therefore, the present invention solves this problem by replacing the standard DOS MBR with a Dual Use Master Boot Record, referred to previously as DUMBR. In accordance with the DUMBR format, a standard MBR hard disk format is modified by replacing the code portion of Table 1 with the format shown in Table 6. The DUMBR code section contains a modified floppy BPB, and code which is capable of booting as either fixed or floppy. The difference between the DUMBR BPB, and a standard floppy BPB is the Reserved Sectors field. In the simplest case, the DUMBR Reserved Sectors field marks the entire Boot Track, and the first sector of the second track, which is the DBR, as reserved. More accurately, the hidden sectors field in the floppy BPB should be equal to the reserved sectors+the hidden sectors field of the hard drive BPB. A hard disk having DUMBR in the Boot Sector, rather than a standard DOS MBR will still have a hard drive BPB, in the first sector of the partition. Note that to create a DUMBR disk, a standard partitioned media need only have the boot sector replaced with a DUMBR.

| Byte Offset | Field Length | Sample Value | Meaning |
|---|---|---|---|
| 000h | 3 bytes | N/A | Jump over the BIOS parameter block |
| 003h | 8 bytes | N/A | System name field |
| 00Bh | 51 bytes | N/A | BIOS parameter block |
| 03Eh | 384 bytes | N/A | Code portion of the Dual Use Boot Record |
| 1BEh | 64 bytes | N/A | Partition Table |
| 1FEh | 2 bytes | 55h AAh | Validation signature |

Referring to Table 6, DUMBR organization includes a jump for jumping over the floppy BIOS parameter block, a system name field, the floppy BIOS parameter block (see Table 4), the code portion for a Dual Use Boot Record, a Partition Table, and a validation signature.

Referring to again to Table 4, there is shown an example of BPB. If the byte offsets 11h and 19h are set to 0, the BPB would be configured as a floppy BPB, in accordance with the present invention. The Reserved Sectors parameter listed at byte offset O3h is set to a value sufficient to reserve the Boot Track, and that portion of the active partition containing the DBR, including the hard disk BPB and the code portion of the DBR (see Table 2, byte offsets 00Bh and 00Eh), as well as any Reserved Sectors between the DBR and the first copy of the files allocation tables (FATφ). For example, if there are 63 sectors in the Boot Track, and with the code portion of the DBR, and the hard disk BPB of the DBR being located in the first sector of the next track, this Reserved Sectors parameter number is set to 64, i.e., 63+1. However, note that the Reserved Sectors parameter could simply be set to accommodate a convenient organization on the floppy BPB.

Figure 1:
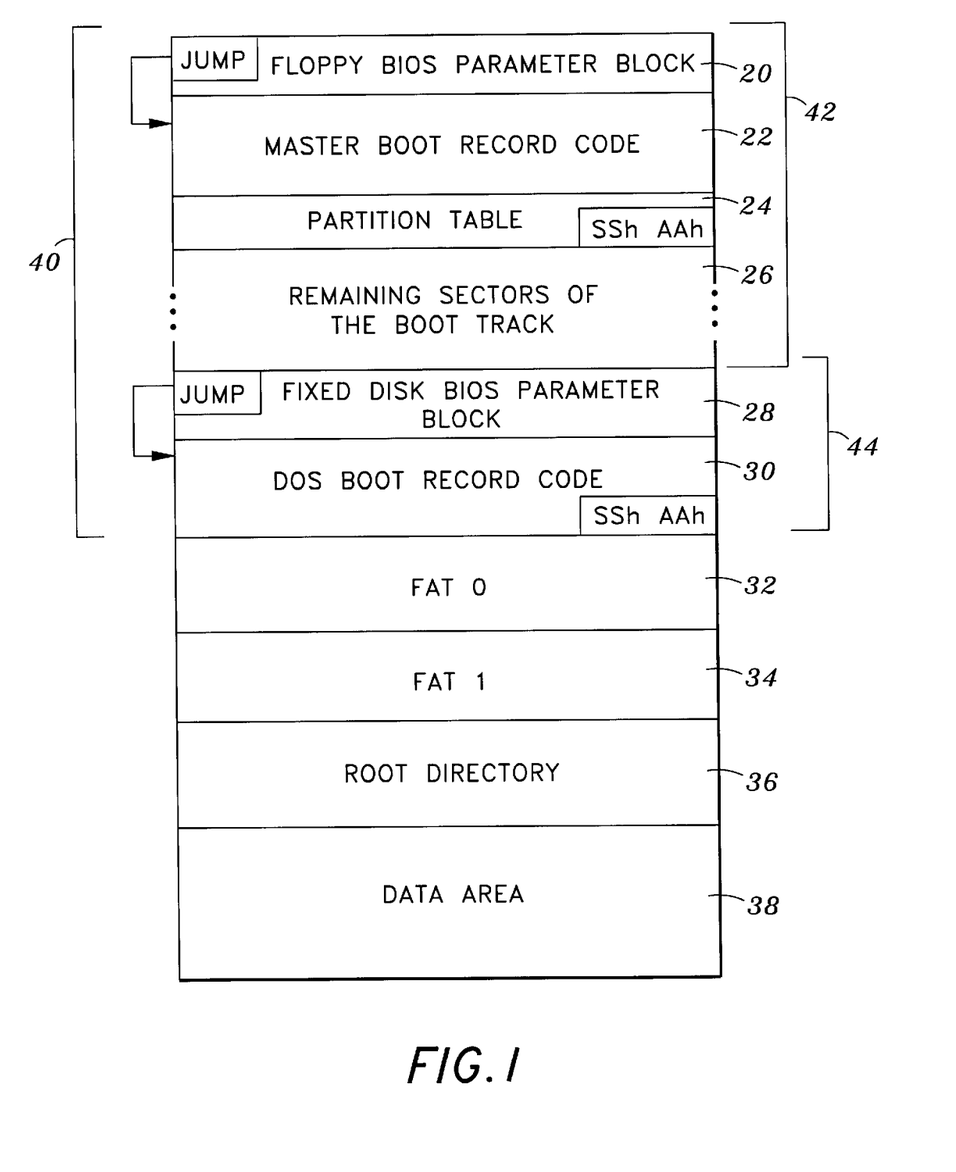
FIG. 1 is a schematic representation of the logical structure of a high capacity medium with a Dual Use Master Boot Record area in accordance with the present invention.

Referring now to FIG. 1, there is shown the typical layout for a HCRM medium in accordance with the present invention. The first sector of the Boot Track, indicated by bracket 42, is shown to contain a floppy BPB 20. The floppy BIOS parameter block typically is preceded by a jump instruction to allow the computer to jump directly to MBR code 22. A Partition Table follows in 24, with the areas comprising 20, 22, and 24 making up the first sector, or Boot Sector, of the media. The remaining sectors of Boot Track 42 are then listed in the area 26 and are usually empty, not by way of limitation, but simply by convention. The Boot Track, as previously discussed, comprises the Hidden Sectors region of a DOS formatted disk (see Table 3).

In the first sector of the HCRM medium's active partition, designated as 44 in FIG. 1, is provided a DBR located in the Reserved Sectors region of a typical DOS formatted disk (see Table 3), and shown as area 30. The BPB of DBR 30, referenced as 00Bh in Table 2, is a hard disk, or "fixed disk" BPB, shown in area 28 of FIG. 1. This hard disk BPB is preceded by a jump instruction to allow the system to jump over non-executable data in hard disk BPB 28 if the system were to boot as a floppy disk, in accordance with the present invention. Following the DBR is a first file allocation table (FATφ) in the area 32, with a second, duplicate of the files allocation table (FATφ), copied into the area 34 and designated as FAT 1. The root directory is provided in the area 36, as per convention, followed by data stored in a data area 38, also as per convention.

Referring again to Table 4, the number of reserved sectors in the BPB is set forth in reference 2; with the number of "hidden sectors" set forth in reference 10. In floppy BPB 20, the bracketed area 40 shown in FIG. 1, indicates the area specified as "reserved". The reserved sectors field of floppy BPB 20 differs from the reserve sectors field of a standard floppy in that all sectors prior to the first copy of the FAT (usually the entire Boot Track, and the DBR, which is the first sector of the second track) is specified as reserved. For the hard disk BPB 28, the bracketed region 42 indicates the area specified as "hidden"; while the bracketed 44 marks the area is specified as "reserved". It is assumed that there are no reserved sectors after the DOS boot record so that FATφ begins in the sector following the DBR.

Figure 2:
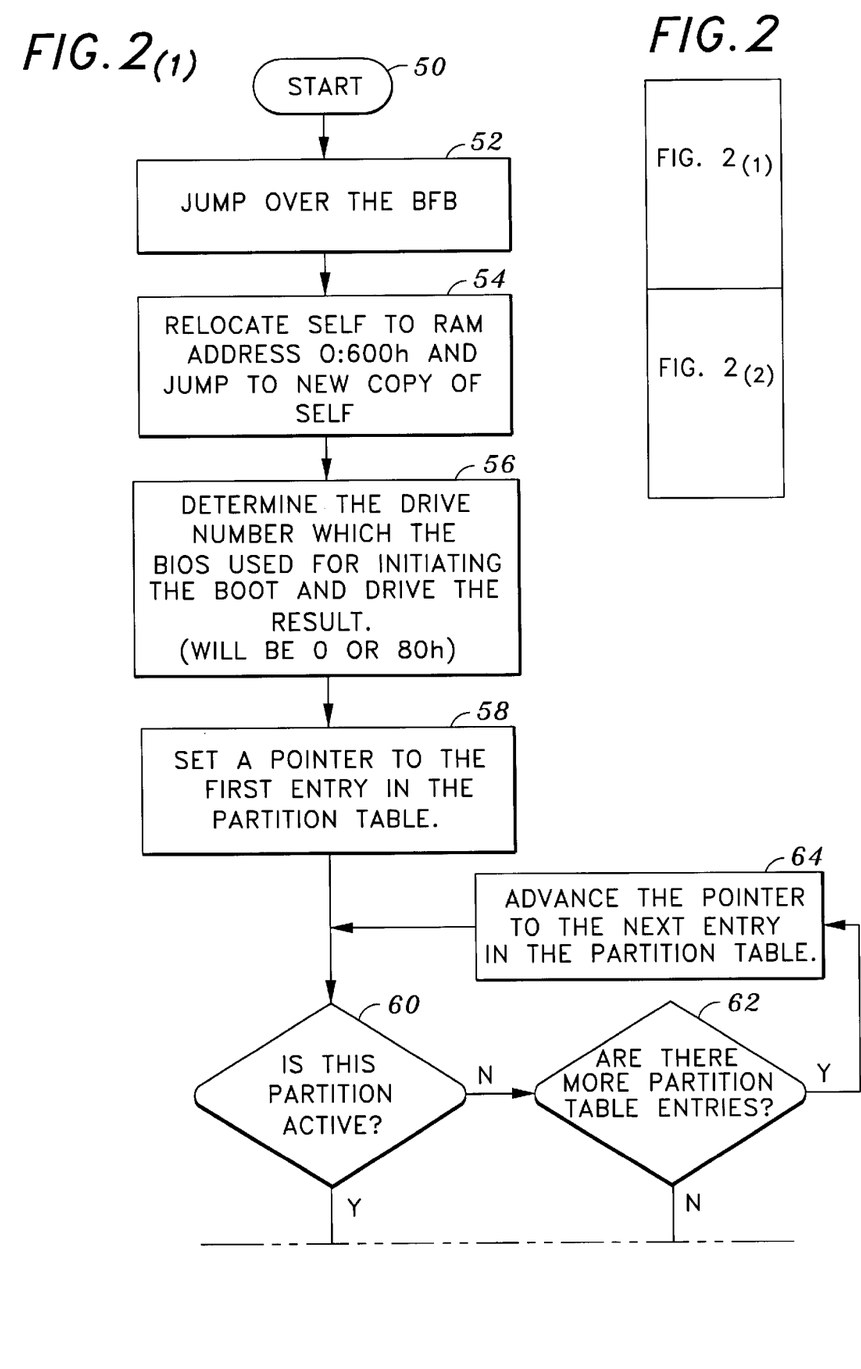
FIG. 2 is a flow chart representing one embodiment of the present invention.

Referring now to FIG. 2, there is shown a flow chart for a method for allowing HCRM media with at least one partition to be bootable with both hard and floppy drives of a computer. At the completion of the systems Power On Self Test (POST), INT 19 is called. By convention, INT 19 will attempt to read a Boot Sector from the default boot drive. If the Boot Sector is found, int 19h reads the Boot Sector into RAM at location 0:7C00h and jumps to 0:7C00h transferring control. If no Boot Sector is found on the default boot drive, INT 19 attempts to read the MBR from the drive. The flow chart of FIG. 2 shows the sequence of events in one particular embodiment of the invention after the system has loaded the Boot Sector of the HCRM media (the contents of bracketed area 42 of FIG. 1, i.e. floppy BPB 20, MBR 22, Partition Table 24; collectively referred to as "DUMBR") in 0:7C00h. of RAM. Beginning at the start block 50 in FIG. 2, the first instruction is a jump instruction at block 52; causing a jump over floppy BPB 20 of FIG. 1, to begin execution of the MBR code 22 of FIG. 1. Next in block 54 of FIG. 2, in accordance with convention, the DUMBR code, executing out of memory location 0:7C00h, copies 1 sector worth of data (512 bytes)from memory location 0:7C00h to another location in memory (by convention 0:600h)and transfers control to the new copy of itself at the new RAM location so that the DBR of the active partition may be subsequently copied to the computer RAM at address 0:7C00h.

Figure 2A:
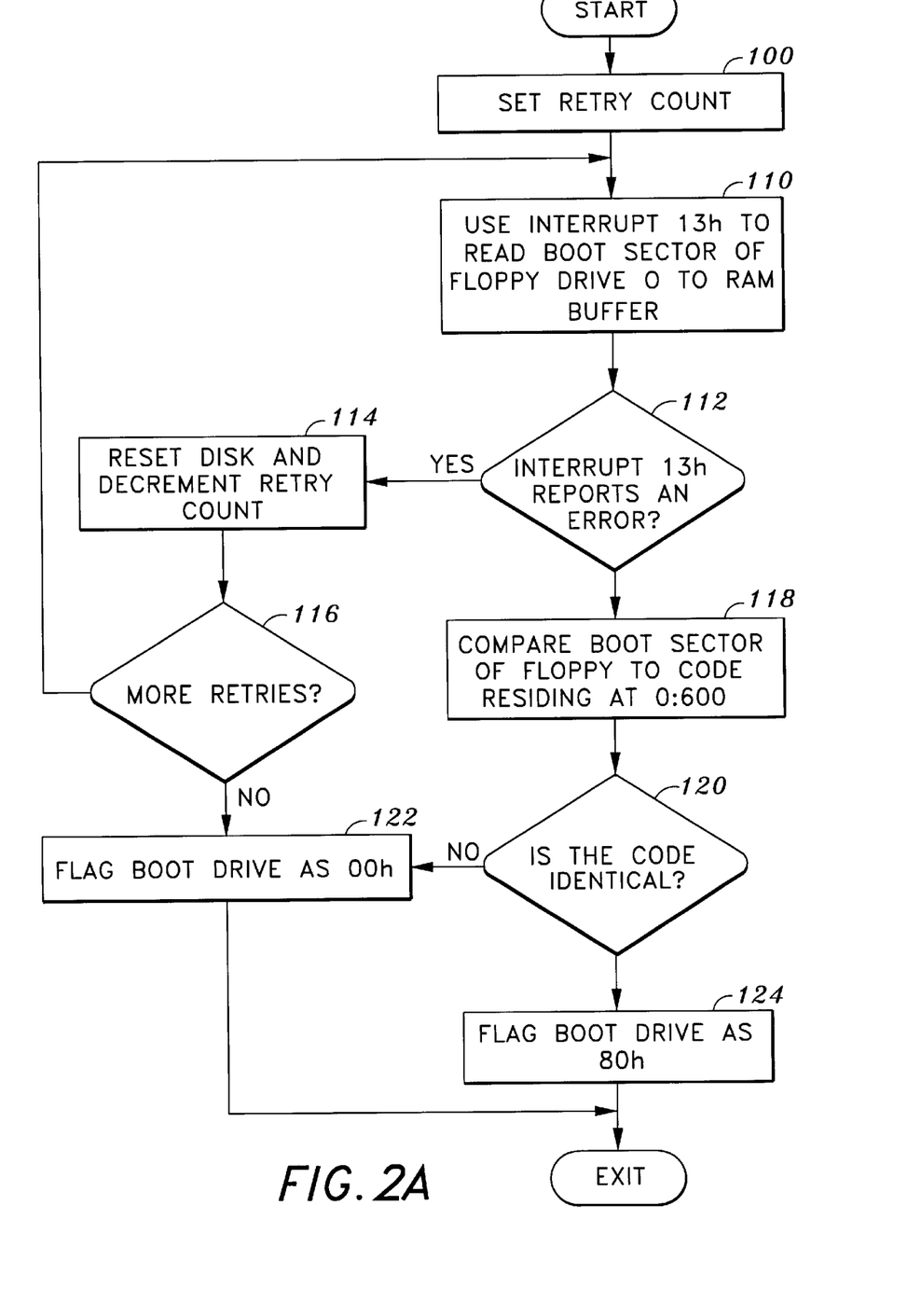
FIG. 2a is a flow chart representing the logic for determining the drive number used by the BIOS for initiating the boot process depicted in FIG. 2.

Next, in block 56, MBR code 22 depicted in FIG. 1 determines the drive number which the BIOS used for initiating the boot and then saves the result. There are a variety of techniques which may be utilized to accomplished this determination. By way of example, but not by way of limitation, FIG. 2(*a*) identifies one way that such a determination can be made.

Referring to FIG. 2 (*a*), in step 100 the system sets a count number for the number of attempts to be made in reading the Boot Sector of the media in floppy drive 0 into the RAM buffer. Next, INT 13 attempts to read the Boot Sector of the media in floppy drive 0 to the RAM buffer as indicated by block 110. If INT 13 reports an error, shown by block 112, the system decrements the count in block 114 and determines if more attempts to boot are to be made in block 116. If more retries exist the system loops back to block 110 to make another read attempt. Generally, a set number of retries is provided (such as 10) to allow for INT 13 errors that may result if the media is not properly spun up for example. If there is no INT 13 error report, the Boot Sector of the media in the floppy drive is read into RAM and the system moves to the next step, block 118, and compares in block 120 the entire 512 bytes of the media's Boot Sector now in the RAM buffer to the 512 bytes of code copied into RAM location 0:600h in step 54 of FIG. 2. If the code loaded into the RAM buffer in block 110 is not identical to the code residing in 0:600h, the system flags the boot drive as a floppy, 00h as shown in block 122. If the code in the RAM buffer is not identical to the code residing in RAM location 0:600h, the boot drive is flagged as a hard drive, 80h as in block 124. Note that the boot drive is also flagged as a hard drive if the system continues to receive INT 13 errors and the number of retries is exhausted, as shown in block 116, thereby indicating that the proper data structure is not present in the media's Boot Sector allowing the system to read the media as a floppy drive. If there is no medium in the floppy drive 0, then the BIOS will report that no medium is in the drive and the drive number will be determined to be 80h.

Referring again to FIG. 2, once the drive number which the BIOS used to initiate the boot is determined, the system flags the drive number, and moves to block 58, where the MBR code initializes a pointer to the first entry in Partition Table 24 of FIG. 1 that was loaded into the RAM. The execution then branches to the diamond block 60 and determines whether this entry in the Partition Table is the active partition. If the answer is no, then the execution branches to the diamond block 62 and determines whether all of the Partition Table entries have been examined. If there are more Partition Table entries, then execution branches block 64 and advances the pointer to the next entry in the Partition Table and returns to the diamond block 60. If there are no more Partition Table entries determined in block 62, then the execution prints an error message and takes appropriate error recovery action.

If the computer determines in the diamond block 60 that the pointer is set to the active partition, then execution branches to the block 70 and reads the DBR of the active partition to the RAM buffer memory at address 0:7C00h. The first sector of the active partition will comprise a DOS boot record including a BPB that is correct for a hard disk boot. The execution then steps to the diamond block 72 where the system first looks to the drive number that was flagged in either step 122 or 124, of FIG. 2(*a*), which the BIOS used to initiate the boot process. If the drive number is 0, for a floppy drive designation, then it copies the modified floppy BPB of DUMBR, located in memory at 0:600h, and overwrites the hard disk BPB of the DBR that was loaded in the RAM at 0:7C00h, with the modified floppy BPB that is part of DUMBR. The DBR of the active partition now has a BPB with the correct physical drive number, and a Reserve Sectors field for a floppy drive boot. Then the execution goes to the block 76 of FIG. 2 and jumps to the DBR to transfer control and the HCRM media boots as a floppy.

Alternatively, if the step in diamond block 72 of FIG. 2 determines that the boot drive number is not 0, but the drive number is 80h, then execution jumps to 0:7C00h and DUMBR transfers control to the DBR in the RAM buffer at address 0:7C00h (see block 76) without any overwrite of the hard disk BIOS parameter block having been performed.

It should be noted that the present invention has been described in the context of a standard organization for disk media where the boot sector is located in the first sector of the first track. It would be obvious to one of ordinary skill in the art to locate the boot sector to other locations on the disk. Accordingly, the present invention is not limited to the boot sector being in a particular location on a disk.

It should also be noted that the Dual Use Master Boot Record of the present invention could be separated from the high capacity medium that is being addressed and/or booted, as noted above. Accordingly, the floppy BPB, the MBR code, and the Partition Table could be stored permanently in another drive in the computer, or could be downloaded from a network, with the only requirement being that the correct BPB be used to describe the media correctly based upon the drive number from which the system BIOS initially attempted to boot.

The presently disclosed data structure, method, and high capacity computer article of manufacturer support partitioned media in both a floppy drive and a hard drive, but require no code to be added to the BIOS, and require no translation of INT 13h parameters. The present invention also removes the need for the operating system vendor to modify the operating system. The method, data structure and high capacity computer article of manufacture of the present invention provide a much higher degree of compatibility with existing operating systems compared to the interrupt 13h filtering method. The data structure of the present invention can be added to any partitioned media without affecting any of the data stored on the media.

For purposes of the present invention the term "floppy" drive means a computer drive for reading and/or writing to a computer readable medium which is removable from the drive and wherein the operating system in the computer typically will expect to read the BPB and the DBR code in the Boot Sector for the medium. A floppy BPB for such a medium will generally have a Hidden Sectors of 0 and a floppy drive number of 0. A floppy will not have a Partition Table.

By the term "hard" drive is meant a computer drive for reading and/or writing to a computer readable medium which is hard, i.e., not ordinarily removable in the normal course of operation. It expects to find a Partition Table, in the Boot Sector of the medium. Note that the different partitions may be formatted for different operating systems. Typically the hard drive will have a BIOS drive code of 80h or higher, and will be referenced in byte offset 19h in the BPB. Typically a hard drive will also have a MBR code for determining from the Partition Table which partition is active, and then going to the head, cylinder, and sector location or logical block address on the medium where the active partition starts and reading the first sector of the active partition into the memory (RAM) of the computer. The first sector for the active partition of a bootable disk will contain a DBR which is comprised of the DOS boot record code and the hard disk BPB.

The foregoing description of a preferred embodiment of the invention has been presented for the purpose of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A high capacity computer article of manufacture to be loaded into a drive of a computer that includes a memory, comprising:

a computer usable medium including at least one partition area and a boot sector, said computer usable medium having computer readable program code means embodied therein, comprising:

first computer readable code means fixed in said boot sector including a first BIOS parameter block for setting parameters for said medium if inserted in a floppy drive of said computer;

second computer readable code means fixed in said boot sector comprising a Partition Table for organizing said medium to include at least one partition and for designating an active partition;

third computer readable code means fixed in said active partition area on said computer readable medium and including a second BIOS parameter block, and DOS boot record code for locating operating system files, loading them into said memory of said computer and causing said computer to execute them; and fourth computer readable code means fixed in said boot sector comprising a master boot record code for loading into said memory of said computer, said third computer readable code means comprising said second BIOS parameter block and said DOS boot record code of said active partition listed in said Partition Table, and causing said computer to execute said DOS boot record code using parameters from said BIOS parameter blocks in accordance with whether said DOS boot record code was loaded from a floppy drive or a hard drive.

2. An article of manufacture as defined in claim 1, wherein said master boot record code in said fourth computer readable code means includes first code for determining whether said DOS boot record was loaded from a floppy drive or a hard drive, and second code for writing at least a reserved sectors parameter, a floppy drive number, and a hidden sectors parameter of said first BIOS parameter block of said first computer readable code means into a copy of said second BIOS parameter block that has been loaded in said memory of said computer if said first code determines that the operating system boot record code was loaded from a floppy drive, and then executing the DOS boot record code using the modified copy of the second BIOS parameter block.

3. An article of manufacture as defined in claim 2, wherein said second code for writing in said fourth computer readable code means overwrites said second BIOS parameter block loaded in said memory of said computer with said first BIOS parameter block prior to execution of the DOS boot record code.

4. A computer readable data structure to allow a computer readable medium to be usable with hard and floppy drives of a computer comprising:

first computer readable code means comprising a first BIOS parameter block for setting parameters for said medium if inserted in a floppy drive of said computer; and second computer readable code means comprising a Partition Table for organizing said medium to include at least one partition and for designating an active partition; and third computer readable code means comprising a master boot record code for loading into said memory of said computer, a second BIOS parameter block and a DOS boot record code of said active partition listed in said Partition Table, and causing said computer to execute said DOS boot record code using parameters from said BIOS parameter blocks in accordance with whether said DOS boot record was loaded from a floppy drive or a hard drive.

5. A computer readable data structure as defined in claim 4, wherein said master boot record code in said third computer readable code means includes first code for determining whether said DOS boot record code was loaded from a floppy drive or a hard drive, and second code for writing a reserved sectors parameter, a floppy drive number code, and a hidden sectors parameter of said first BIOS parameter block of said first computer readable code means into a copy of said second BIOS parameter block that has been loaded in said memory of said computer if said first code determines that the DOS boot record code was loaded from a floppy drive, and causing the computer to execute the DOS boot record code using this modified copy of the second BIOS parameter block.

6. A high capacity computer readable medium to be loaded into a drive of a computer comprising:

a boot track;

first computer readable code means fixed in said boot sector comprising a floppy BIOS parameter block for setting parameters for said medium if inserted in a floppy drive of said computer, said floppy BIOS parameters block including a reserved sectors parameter, a floppy drive number code, and a floppy hidden sectors parameter; second computer readable code means fixed in said boot sector comprising a Partition Table for organizing said medium to include at least one partition and for designating a partition as an active partition;

third computer readable code means including a hard disk BIOS parameter block, and a DOS boot record code fixed in said active partition on said computer readable medium for locating operating system files, loading them into said memory of said computer and causing said computer to execute them; and fourth computer readable code means fixed in said boot sector comprising master boot record code for loading into said memory of said computer a copy, said third computer readable code means comprising said hard disk BIOS parameter block and said DOS boot record code of said active partition, said master boot record code including first code for determining whether said DOS boot record code was loaded from a floppy drive or a hard drive in said computer, and second code for writing all or a portion of said floppy BIOS parameter block of said first computer readable code means over a copy of said hard disk BIOS parameter block loaded into said memory of said computer if said first code determines that said DOS boot record code had been loaded from a floppy drive, and causing said computer to execute said DOS boot record code, using this modified copy of said second BIOS parameter block.

7. A method for allowing a high capacity media with at least one partition to be usable with hard and floppy drives of a computer that has a memory, comprising the steps of:

loading from a drive a first BIOS parameter block, a master boot record code and a Partition Table into the memory of said computer;

causing said computer to execute said master boot record code including the steps of:

determining whether the drive is a floppy drive or a hard drive;

determining an active partition from said Partition Table, and loading from said active partition into said memory a boot area including a DOS boot record code and a second BIOS parameter block;

selecting parameters from said BIOS parameter blocks for use with said DOS boot record code in accordance with whether said DOS boot record code was loaded from a floppy drive or a hard drive; and causing said computer to execute DOS boot record code.

8. A method as defined in claim 7, wherein said selecting step comprises the step of:

if the drive is a floppy drive, then writing into said second BIOS parameter block a reserve sectors parameter designating at least the location of said first BIOS parameter block as a reserved area, and changing a plurality of second BIOS parameter block loaded in said memory to first BIOS parameter block; and causing said computer to execute said DOS boot record code using this modified second BIOS parameter block.

9. A method as defined in claim 8, wherein said reserve parameter loading step comprises the step of writing said first BIOS parameter block over said second BIOS parameter block in said memory.

10. A method as defined in claim 8, wherein said step of changing a plurality of second BIOS parameters block, to first BIOS parameter block parameters comprises changing a physical drive number code to a floppy drive number code and changing a hard disk hidden sectors parameter to a floppy hidden sectors parameter in said copy of said second BIOS parameter block loaded into said memory.

* * * * *